United States Patent [19]

Anderson et al.

[11] Patent Number: 5,025,445
[45] Date of Patent: Jun. 18, 1991

[54] SYSTEM FOR, AND METHOD OF, REGULATING THE WAVELENGTH OF A LIGHT BEAM

[75] Inventors: Stuart L. Anderson, San Diego; Richard L. Sandstrom, Encinitas, both of Calif.

[73] Assignee: Cymer Laser Technologies, San Diego, Calif.

[21] Appl. No.: 440,605

[22] Filed: Nov. 22, 1989

[51] Int. Cl.$^5$ .............................................. H01S 3/10
[52] U.S. Cl. .......................................... 372/20; 372/32
[58] Field of Search ....................... 372/29, 32, 28, 20, 372/33, 108, 24, 102

[56] References Cited

U.S. PATENT DOCUMENTS

| | | | |
|---|---|---|---|
| 4,864,578 | 9/1989 | Proffitt et al. | 372/20 |
| 4,896,327 | 1/1990 | Ebbery | 372/32 |
| 4,897,843 | 1/1990 | Scott | 372/20 |
| 4,905,243 | 2/1990 | Lokai et al. | 372/32 |
| 4,914,662 | 4/1990 | Nakatani et al. | 372/32 |
| 4,932,030 | 6/1990 | Chung | 372/32 |

Primary Examiner—Frank Gonzalez
Assistant Examiner—Galen J. Hansen
Attorney, Agent, or Firm—Ellsworth R. Roston; Charles H. Schwartz

[57] ABSTRACT

A laser light beam is processed in a first optical path to produce light indications in a plurality of free spectral paths. These light indications are introduced through slits to produce signals at spaced positions at the opposite peripheries of a linear detector array. The distances between correlated pairs of energized detectors at the opposite peripheries of the array indicate the relative value of the laser wavelength in the free spectral ranges. The laser light beam is also processed in a second optical path, simultaneously with the processing of the laser light beam in the first optical path, to produce light in a single path. The second optical path is dependent upon the wavelength of the laser light beam. The light produced in the second optical path may be introduced through another slit to energize centrally disposed detectors in the array. The particular detectors energized are dependent upon the wavelength of the laser light. The detectors in the linear array may be scanned to produce signals related in time to the disposition of the detectors energized in the array. A data processing system processes these signals and produces a signal to adjust the wavelength of the laser beam to a particular value. When the laser is pulsed, the system described above may operate in real time after each pulse to adjust the laser before the next pulse to produce light at the particular wavelength.

25 Claims, 6 Drawing Sheets

SYSTEM FOR, AND METHOD OF, REGULATING THE WAVELENGTH OF A LIGHT BEAM

This invention relates to systems for regulating the wavelength of light as from a laser. More particularly, this invention relates to a system which is operative in real time to produce an indication, without any ambiguities, of the wavelength of the light as from a laser and which is responsive to such indication to adjust the wavelength of the light as from the laser to a particular value. The invention also relates to a method of regulating the light as from a laser in real time at a particular value.

Integrated circuit chips are being produced in ever increasing volumes for use in all kinds of electrical equipment and digital computers and data processing systems. The integrated circuit chips are produced from dies which are disposed in a repetitive pattern on a wafer. Tens, and sometimes even hundreds, of such dies may be disposed on a wafer. In view of the considerable number of dies on a wafer, each wafer has to be processed precisely because an error in the processing of one die on a wafer may be repeated in the processing of other dies on the wafer. This precise processing is particularly important because the value represented by the different dies on a wafer may be in the thousands, and even tens of thousands, of dollars.

Each die on a wafer is formed from a plurality of layers. Each layer is formed in a precise pattern, generally quite complex. Some of these layers are formed from electrical material to represent electrical circuitry. Others of these layers are formed from dielectric material to provide electrical insulation between the electrically conductive layers. An error in the processing, or an imprecise processing, of any one of the layers on a die may result in a die which does not meet the specifications established for the die.

To form each layer on a die, a substantially uniform coating of a particular material may be deposited on a substrate formed from a base material such as silicon or on a material previously deposited on the substrate. For example, when the substantially uniform material is electrically conductive, it may be formed from a suitable material such as aluminum. The aluminum is then covered with a thin and substantially uniform layer of a masking material.

Light is then directed at the masking material through a mask. The mask is constructed to pass light in a spatial pattern corresponding to the spatial pattern desired for the electrically conductive material in the layer. The light passing to the layer hardens the masking material. An etching material such as an acid is then applied to the electrically conductive material. The etching material etches the electrically conductive material at the positions where the masking material has not been hardened. In this way, the electrically conductive material remains in the layer only at the positions where the masking material has been hardened. The hardened masking material is then washed from the layer to provide the desired pattern on this layer of the chip.

As will be seen, the light applied through the mask to the masking material on the electrically conductive layer has to be precisely controlled. In many applications of this nature, lasers are used. Lasers are desirable because they provide substantially monochromatic light at high power levels. In recent times, the lasers used have been excimer lasers in the ultraviolet range. For example, excimer lasers with a wavelength of approximately 248 nm have been, and are being, employed to harden a layer of masking material in a particular pattern. These lasers are tunable over a relatively narrow range of wavelengths.

When lasers are employed to harden the masking material, it is desirable that the wavelength of the light from the laser be closely regulated to about 1 part per million. This results from the fact that changes in the wavelength of the light from the laser adversely affect the focussing of the light at the surface of the masking layer. This adversely affects the sharpness of the pattern in which the masking material is hardened. It accordingly adversely affects the sharpness of the pattern of the electrical circuitry produced in the electrically conductive layer covered by the masking material. This in turn adversely affects the electrical characteristics of the electrical circuitry.

Due to practical engineering limitations, excimer lasers are generally pulsed at a particular repetition rate, such as approximately two hundred (200) pulses per second. It would be desirable to adjust the wavelength of the laser pulses in real time and in a time shorter than the time between pulses so that the wavelength of the light in each pulse is substantially a particular value such as approximately 248 nm. Furthermore, it would be desirable to provide this adjustment in a manner such that the wavelength of the laser light in each pulse is detected without any ambiguity in the detection. Until now, no one has provided a regulating system with the characteristics discussed above.

This invention provides a system which meets the objectives discussed above. The system measures the wavelength of each light pulse from a laser, even at a repetition rate as high as 200 pulses per second or even higher, and adjusts the wavelength of the light in the next pulse from the laser toward a particular value such as 248.000 nanometers. This wavelength value can be set to match with any particular lens design, or altitude of stepper installation. The wavelength can also be changed or slewed during a single exposure if desired. The system operates in real time and without any ambiguities.

The system of this invention is able to operate over a large range of wavelengths without any adjustment. The system is not affected by changes in atmospheric temperature or pressure. Furthermore, the system operates to sample the light from the complete cross-section of the laser beam so as to enhance the accuracy in the regulation of the wavelength of the light from the laser. The system provides this regulation by providing a compact optical path which enhances the dimensional stability of the system and results in excellent long-term precision and stability.

In one embodiment of the invention, a laser light beam is processed in a first optical path to produce light indications in a plurality of free spectral paths. These light indications are introduced through slits to produce signals at spaced positions at the opposite peripheries of a linear detector array. The distances between correlated pairs of energized detectors at the opposite peripheries of the array indicate the relative value of the laser wavelength to high accuracy, but with an inherent additive ambiguity equal to an integer times a constant factor related to the optical system.

The laser light beam is also processed in a second optical path simultaneously with the processing of the laser light beam in the first optical path. The second optical path is dependent upon the wavelength of the laser light beam. The light produced in the second optical path may be introduced through another slit to energize centrally disposed detectors in the array. The particular detectors energized are dependent upon the wavelength of the laser light. The "coarse" wavelength information derived from the second optical path is used to remove the ambiguities in the wavelength information derived from the first optical path. Because there are no ambiguities, the laser wavelength can be calibrated to an absolute wavelength reference anywhere under the laser gain profile, and then slewed to the chosen operating wavelength. For example, even the normal carboninduced absorption line at approximately 247.856 nm could be used for such calibration.

The detectors in the linear array may be scanned to produce signals related in time to the disposition of the detectors energized in the array. A data processing system processes these signals and produces a signal to adjust the wavelength of the laser beam to a particular value. When the laser is pulsed, the system described above may operate in real time after each pulse to adjust the laser before the next pulse to produce light at the particular wavelength.

Figure 1:
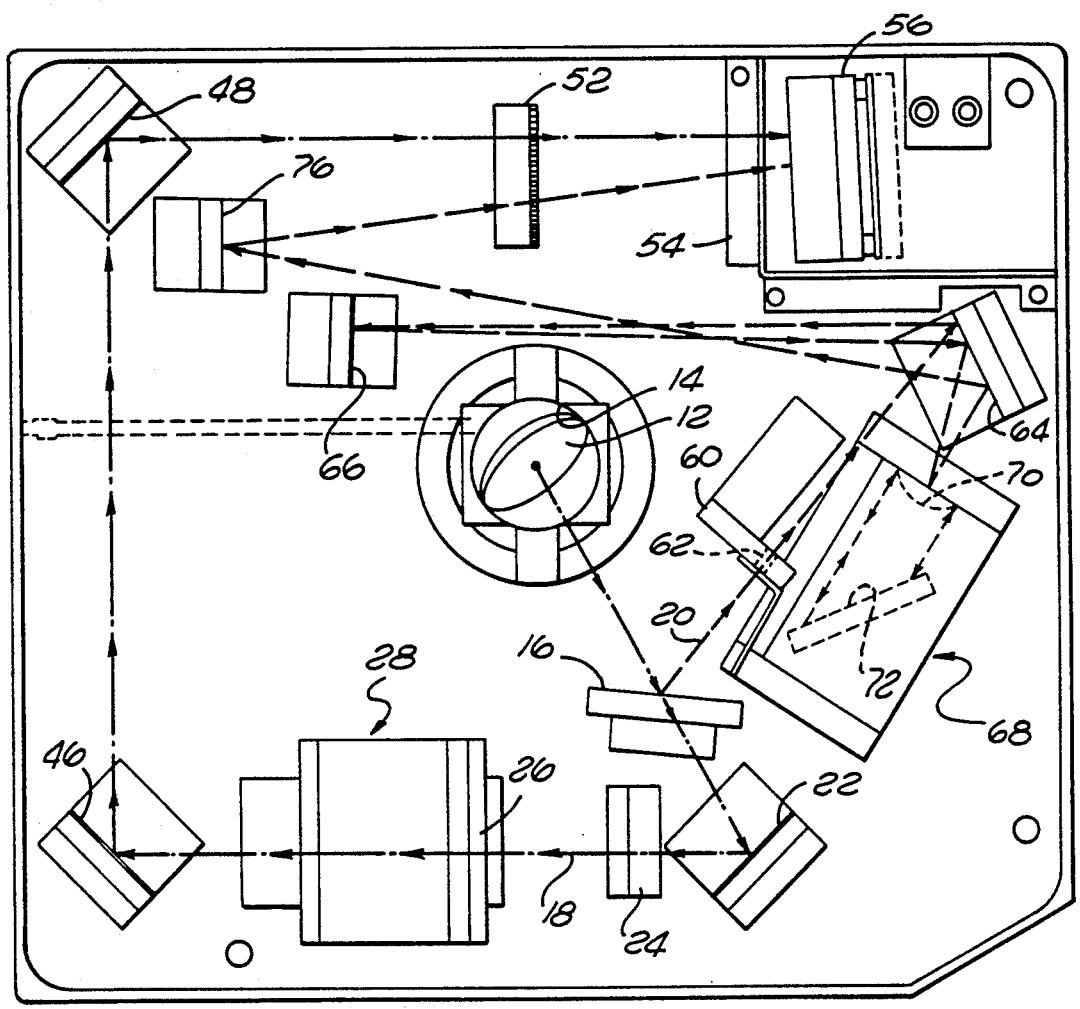
FIG. 1 is a plan view schematically illustrating an optical system included in one embodiment of this invention to determine the wavelength of a light beam from a laser.
Figure 5:
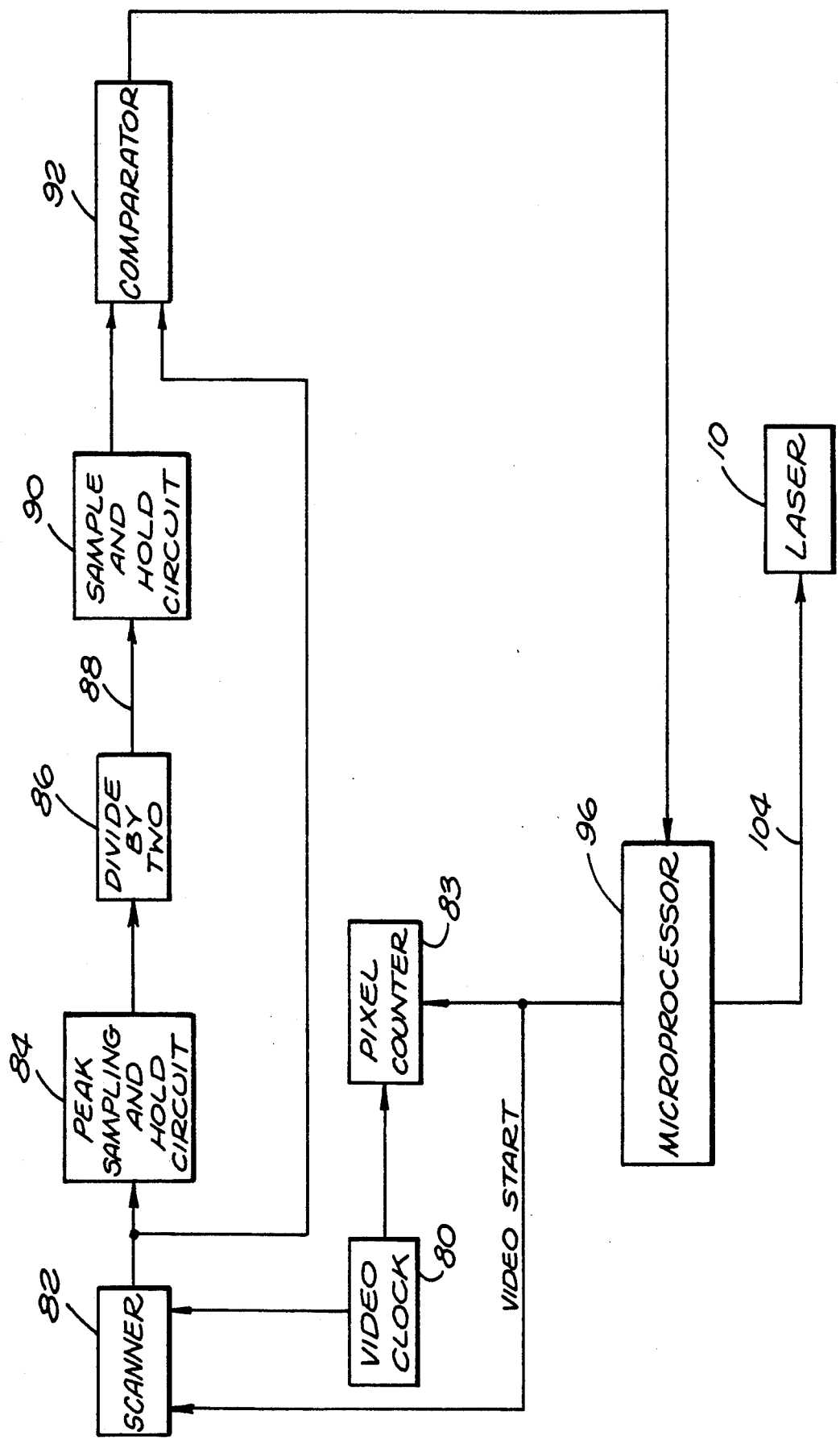
FIG. 5 is a schematic view, primarily in block form, of an electrical system which is operative in conjunction with the optical system of FIG. 1 to determine and regulate the wavelength of the light beam from the laser.
Figure 6:
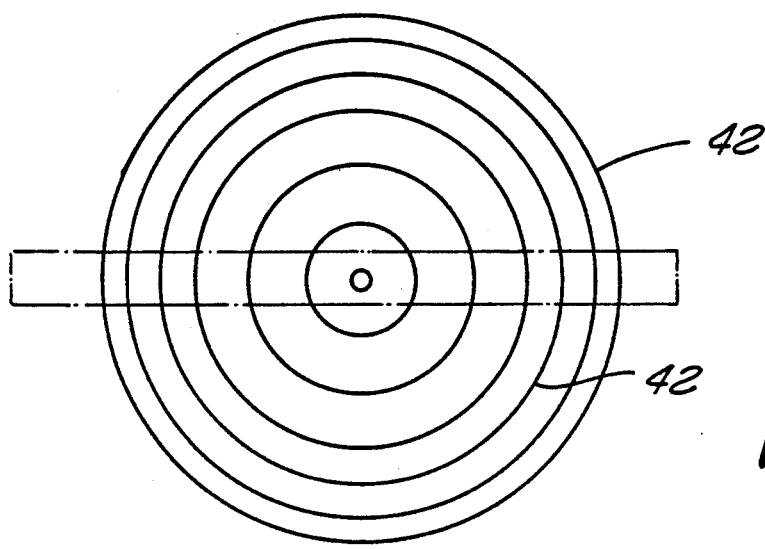
FIG. 6 is a schematic view illustrating the relative disposition of optical rings of light produced by the optical system of FIG. 1.
Figure 8:
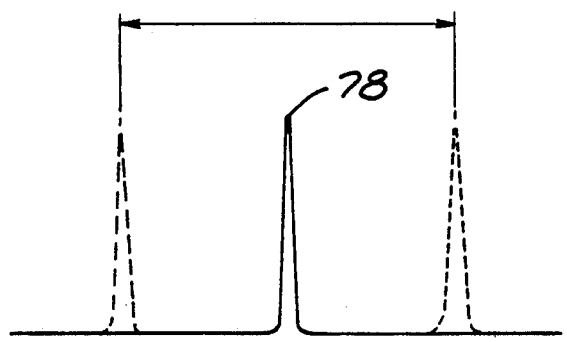
Figure 9:
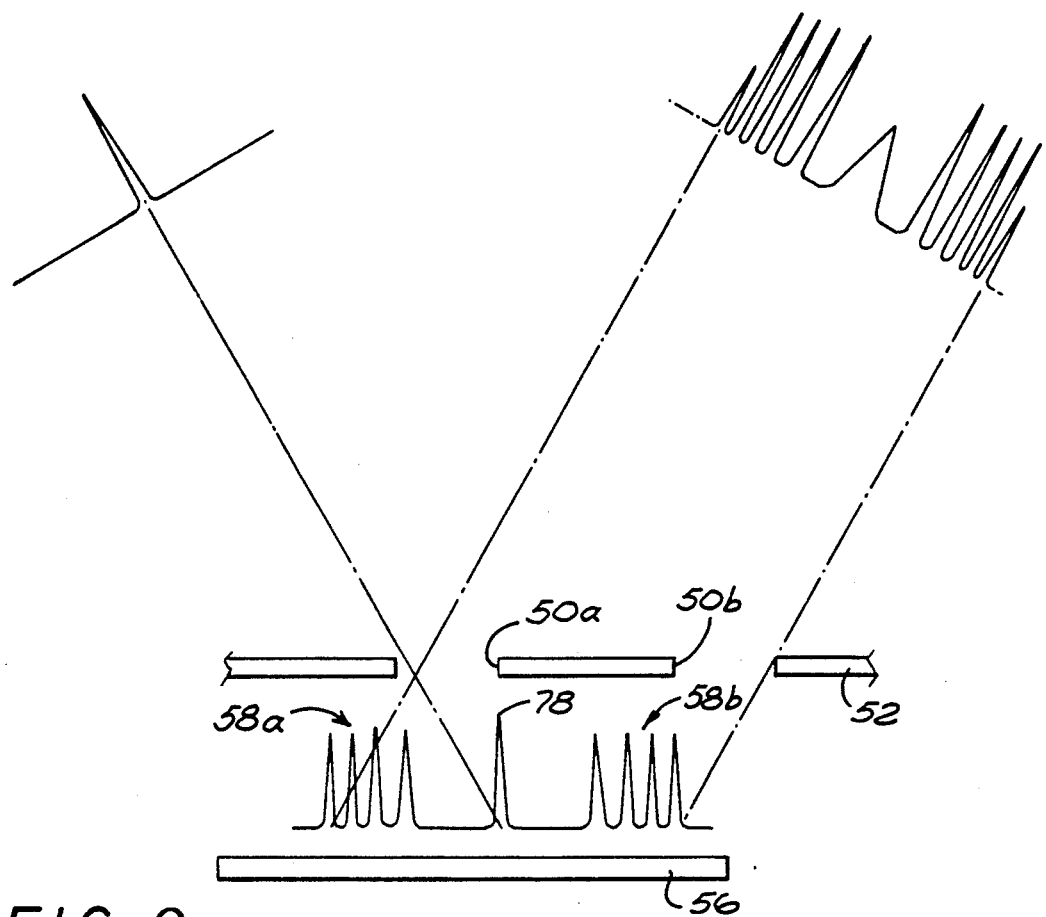
Figure 10:
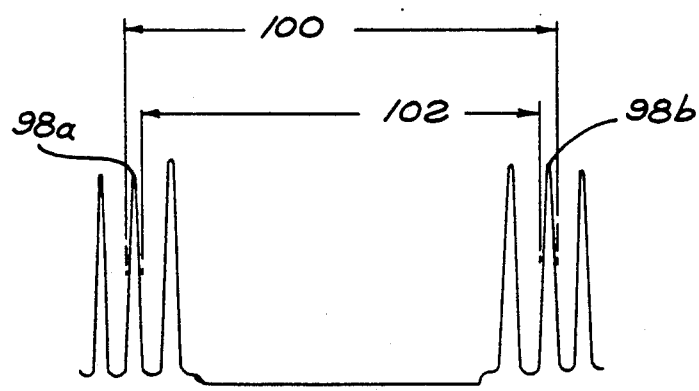
Figure 11:
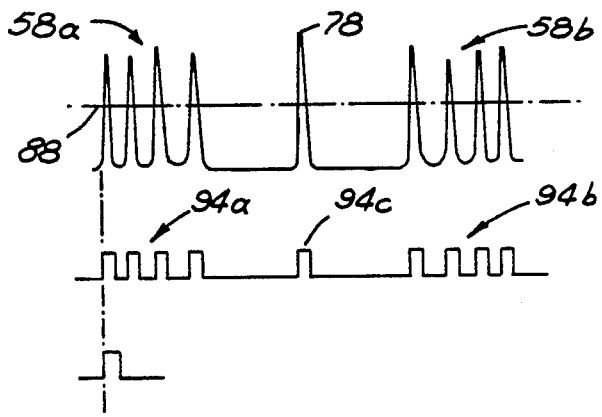
Figure 13:
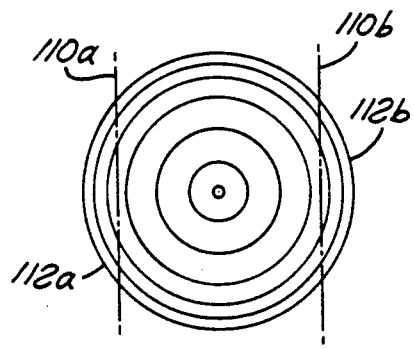
Figure 12:
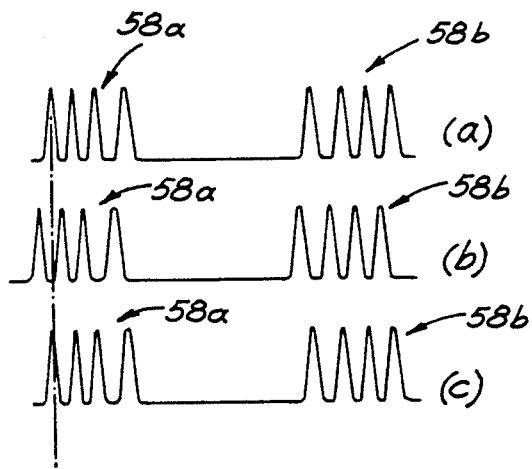
Figure 14:
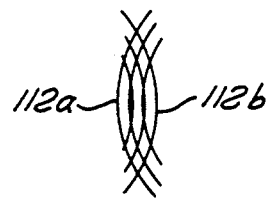
Figure 15:
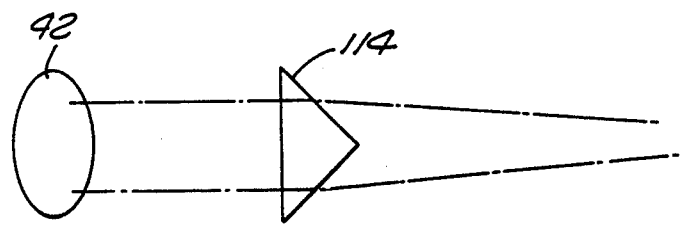

FIG. 8 schematically illustrates another signal produced by the optical system of FIG. 1 to provide a coarse indication of the wavelength of the light beam from the laser;

FIG. 9 is a schematic view of a mask and an array of detectors for obtaining the production of a pattern of signals by the detectors in accordance with the processing of light from the laser by the optical system shown in FIG. 1;

FIG. 10 schematically illustrates how the electrical system shown in FIG. 5 processes the signals shown schematically in FIG. 9;

FIG. 11 schematically illustrates the pattern of signals passing through a comparator included in the electrical system shown in FIG. 5;

FIG. 12 schematically illustrates how the positions of the rings shown in FIG. 5 becomes shifted with changes in the wavelength o the light from the laser;

FIG. 13 illustrates the portions of the optical rings shown in FIG. 6 that can be consolidated by including another etalon assembly in the optical system of FIG. 1 instead of a grating as in the embodiment shown in FIG. 1;

FIG. 14 illustrates the optical pattern after the portions shown in FIG. 13 have been optically consolidated; and FIG. 15 schematically illustrates a prism for providing the optical consolidation shown in FIGS. 13 and 14.

In one embodiment of the invention, a system is provided for regulating the wavelength of light from a laser 10. The laser is typically pulsed at a suitable repetition rate such as approximately two hundred (200) pulses per second. While the particular embodiment of this invention is for a pulsed laser, the invention will work equally well on a laser operating on a continuous basis. The laser provides monochromatic light at high power levels. Preferably the laser is an excimer laser which operates at a suitable wavelength of approximately two hundred and forty eight nanometers (248.000 nm).

The system of the invention includes an optical sub-system shown schematically in FIG. 1 and an electronic sub-system shown primarily in block form in FIG. 5. The optical system in FIG. 1 may be considered to be a plan view with the laser disposed below the plane of the paper and pointed vertically upwardly toward a primary splitter assembly 12. The splitter assembly 12 is shown in FIG. 1 as being disposed at an angle to the laser 10.

Figure 2:
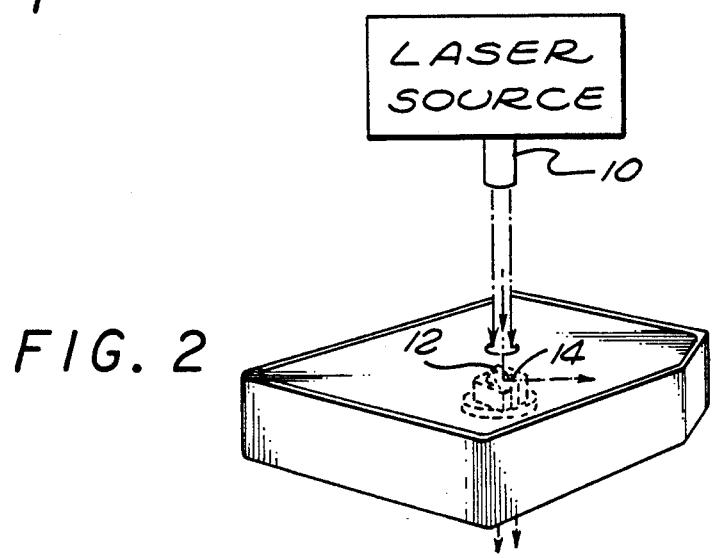
FIG. 2 is a perspective view illustrating the disposition of the laser relative to certain components in the optical system shown in FIG. 1.

The beam splitter 12 (also shown in FIG. 2) is disposed in an opening 14 and may be formed from a coated or uncoated quartz plate. The beam splitter 12 is constructed to pass a large portion (approximately 95%) of the light from the laser 10 to a target such as a semi-conductor wafer (not shown). However, a relatively small fraction (approximately 5%) of the light directed by the laser 10 to the beam splitter 12 is reflected by the beam splitter to another beam splitter 16. The beam splitter 16 may be constructed in a manner similar to that described above for the beam splitter 12.

The beam splitter 16 splits the light into two (2) paths. One of these paths is indicated in dot-and-dash lines at 18 and the other path is indicated in broken lines at 20. The optical path in the dot-and-dash lines 18 provides a fine control over the amplitude wavelength of light from the laser 10 and the optical path shown in broken lines at 20 in FIG. 1 provides a coarse control over such wavelength. Signals are produced from the light in each of the optical paths 18 and 20 by the electrical system shown in FIG. 5. These signals are processed by the electrical system shown in FIG. 5 to obtain the production of a control signal for regulating the wavelength of the light from the laser 10.

The light passing in the path 18 through the beam splitter 16 is reflected by a mirror 22 to a lens 24 which operates to focus the light. The light then passes through a diffuser 26 (FIGS. 1 and 3) to an etalon assembly generally indicated at 28.

The etalon assembly 28 may include a pair of members having highly reflective surfaces 30a and 30b the surfaces 30a and 30b are separated by a spacer 32 made from a suitable material such as Zero-Dur providing a low coefficient of thermal expansion. The members providing the reflective surfaces 30a and 30b are separated by a suitable dielectric such as air or vacuum. The members with the highly reflective surfaces 30a and 30b are mounted on supports 34 made from a suitably resilient material such as rubber to absorb mechanical shocks and vibrations. The diffuser 26, the members providing the reflective surfaces 30a and 30b, the spacer 32 and the supports 34 may be disposed in a housing 36 filled with a vacuum or a suitably inert material such as nitrogen. In this way, the etalon assembly 28 is not affected by atmospheric changes in temperature and pressure. A Fourier transforming lens 40 may also be disposed in the housing 36.

The diffuser 26 spatially and angularly mixes the light from the lens 24 to uniformly sample the entire laser light beam from the standpoint of beam wavelength and line width content. The diffused light is then sampled in the etalon assembly 28 to provide a reflection of light back and forth between the highly polished surfaces 30a and 30b. The light from the etalon assembly 28 then passes to the Fourier transforming lens 40, which transforms the light from the etalon assembly 28 to produce concentric rings 42 (FIG. 6) in a pattern in which ring widths are proportional to spectral line width and the diameters provide information relating to wavelength and wavelength stability. The successive ones of the concentric rings 42 may be considered to be separated from one another by a wavelength which may be defined a the free spectral range or the etalon. In the light transformed by the Fourier transforming lens 40, the progressive pairs of rings 42 are spaced from a central position by progressively decreasing distances as shown schematically in FIG. 6.

The light from the lens 40 passes to a mirror 46 which reflects the light to a mirror 48. The light reflected from the mirror 48 in turn passes through a pair of spaced and narrow slits 50a and 50b in a mask 52 (FIG. 9). The light passing through the slits 50a and 50b is then introduced to a shield 54 which blocks the passage of stray light and limits the passage of light only to the light passing through the slits 50a and 50b.

Figure 7:
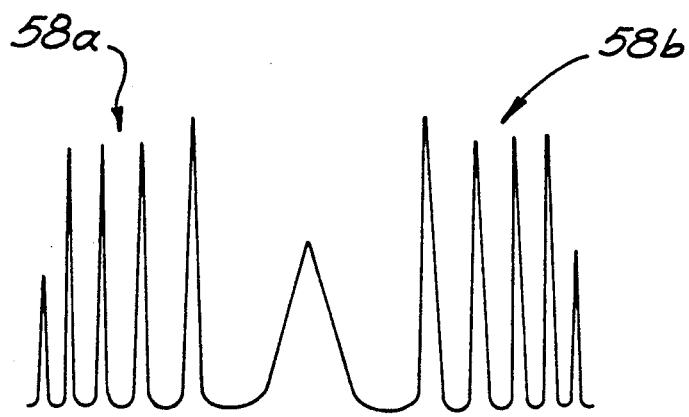
FIG. 7 illustrate the relative pattern of signals produced by the optical rings shown in FIG. 6.

The light then falls on a linear array of optical detectors 56 (FIGS. 1 and 9) to produce signals 58a and 58b (FIG. 7) at the optical detectors in accordance with the pattern of the spectral rings 42. As will be seen, the signals 58a and 58b are produced at the opposite peripheries of the linear array of the optical detectors 56. The distance of the signals 58a and 58b from the center of the detector array may vary depending upon several factors. One of these factors may result from variations in the position of the surfaces 30a and 30b in the etalon assembly 28 as a result of movement of the supporting rubber pads 34. Another of these factors may result from other mechanical or thermal drifts in the optical components which provide the optical path 18. As will be seen subsequently, however, these variations may be accommodated by the system constituting this invention so that they do not affect the wavelength indications provided by the system.

Figure 4:
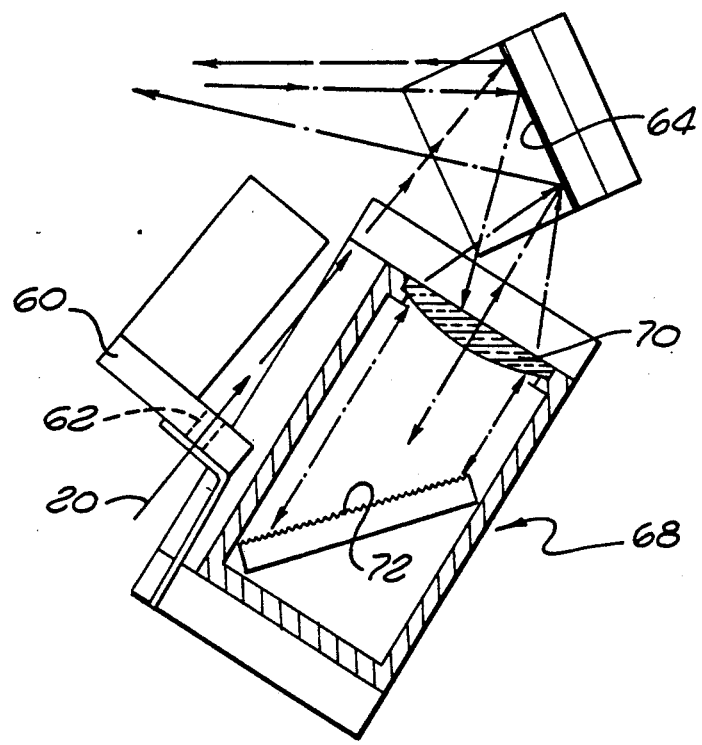
FIG. 4 is a schematic view of a grating and a mirror included in the optical system shown in FIG. 1.

As previously described, a relatively small portion of the light passing to the beam splitter 16 is reflected into the optical path 20 to a mask 60 having a slit 62. The light passing through the slit 62 travels to a mirror 64 which reflects the light to a mirror 66. The mirror in turn reflects the light back to the mirror 64 for reflection to a coarse diagnostic assembly generally indicated at 68 in FIGS. 1 and 4. By providing a multiple folded light path between mirrors 64 and 66, a compact optical arrangement is achieved.

The coarse diagnostic assembly 68 (FIGS. 1 and 4) includes a lens 70 which collimates the light originating from the slit 62 and introduces the collimated light to a grating 72. The grating 72 acts to reflect the incoming light in different directions depending upon the frequency of the light. Each direction represents a different color component or different wavelength. The grating 72 is constructed, and is disposed at a particular angle, so that the light at a wavelength of approximately 248 nm is reflected by the grating back to the mirror 64. As the light travels from the grating 72 through the lens 70 to the mirror 64, the lens acts to focus the light.

The light passing through the lens 70 in the path 20 is reflected by the mirror 64 to a mirror 76 which in turn reflects the light to the mask 52. The light passes through the slit 50a in the mask 52 to the shield 54, which acts to block the passage of stray light. The light then falls on the linear array of detectors 56. The light produces a single pulse of light 78 at a central position in the linear array of the detectors 56.

The positions of the particular detectors 56 producing the signal 78 are dependent upon the wavelength of the light from the laser 10. The signal 78 produced by the detectors 56 is indicated in solid lines in FIG. 8. Broken lines to the left and right of the signal 78 in FIG. 8 indicate changes in the wavelength above and below the value represented by the signal 78 in solid lines.

The electrical system shown in block form in FIG. 5 processes the signals 58a and 58b and the signal 78 to indicate the wavelength of the light from the laser 10. The system shown in FIG. 5 includes a video clock 80 which may be constructed in a conventional manner. The video clock 80 synchronizes the scanning of the detectors 56 at a video rate by a scanner 82 to obtain the production of output signals by the scanner at times dependent upon the occurrence of the signals 58a and 58b and the signal 78 in the array. These times may be indicated by a pixel counter 83 which counts the clock signals from the video clock 80.

The signals produced from the light pulses 58a and 58b and the signal 78 are introduced to a sample and hold circuit 84 to obtain the production of the particular one of the signals 58a with the peak amplitude and to obtain the holding of this peak amplitude in the circuit 84. The amplitude of the signal held in the circuit 84 is divided by two (2) in a circuit 86 to produce a resultant signal 88 (FIG. 11) which is held in a circuit 90. The circuits 84, 86 and 90 may be constructed in a conventional manner to operate on an analog or digital basis.

The signal 88 held in the circuit 90 (FIG. 5) is introduced to a comparator 92 which also receives the signals 58a and 58b and the signal 78. The comparator 92 compares the amplitude of the signal 88 with the amplitudes of the signals 58a and 58b and the signal 78 to produce signals 94a, 94b and 94c (FIG. 11) representing the portions of the signals 58a and 58b and the signal 78 with amplitudes greater than the amplitude of the signal 88.

The signals 94a, 94b and 94c (FIG. 11) from the comparator 92 (FIG. 5) are introduced to a data processing system such as a microprocessor 96. The microprocessor 96 compares corresponding pairs of the signals 94a and 94b to determine the pair which has the greatest correlation from a time standpoint relative to a central position in the array of the detectors 56. For example, the outermost one of the signals 94a is compared with the outermost one of the signals 94b relative to the central position in the array of the detectors 56 to determine the time correlation between the two signals. As another example, similar time correlation is determined between the innermost ones of the signals 94a and 94b.

On the basis of the time correlation of pairs of the signals 94a and 94b in the microprocessor 96, the microprocessor selects the pair of signals with the greatest correlation in time relative to a central position in the array of the detectors 56. For example, the microprocessor 96 may select a related pair of signals 98a and 98b. The microprocessor then determines the wavelengths of the selected pair of signals 98a and 98b (FIG. 10) at the outer ends of each of these signals and at the inner ends of the signals. This is indicated schematically in FIG. 10 by the distances 100 and 102. In providing such determinations, the microprocessor 96 operates in conjunction with a pixel counter 83 which provides at each instant a count of the detectors 56 being processed in the linear array at each instant. The wavelengths of the signals can be determined since the positions of the detectors 56 in the array are related to wavelengths.

The microprocessor 96 then processes the wavelengths (represented by the distances 100 and 102 in FIG. 10) on an independent basis and averages the output from the processing to determine a resultant mean wavelength. This wavelength would be a precise indication of the resultant mean wavelength of the light from the laser 10 if there were no ambiguities. However, since the signals 94a and 94b represent a plurality of free spectral ranges as indicated by the rings 42 in FIG. 6, there is an ambiguity if the particular one of the free spectral ranges is not known.

An alternative technique would be to calculate the diameter corresponding to a target wavelength. The processor would then adjust the laser incrementally to produce the required average of diameters.

In the present implementation, the feedback is performed in terms of wavelength to provide greater diagnostic information and faster connection algorithms. For example, both incremental and estimated total error correction can be performed between pulses. In addition, accurate real time slewing can be performed and the target wavelengths can be adjusted at any time.

The possible ambiguity in the wavelength determined by the microprocessor 96 may be seen from FIG. 12. In FIG. 12a, signals 52a and 58b are produced to represent a wavelength of 248.000 nm. However, when the signals 58a and 58b are shifted in position as shown in FIG. 12b, the signals are produced from light from the laser 10 at a wavelength of 248.000 nm. A further shift in the position of the signals 58a and 58b causes the signals in FIG. 12c to coincide with the signals 58a and 58b in FIG. 12a. However, the signals 58a and 58b in FIG. 12c are produced from light from the laser 10 at a wavelength of 248.000 nm. The wavelength interval between exact replications of the signals 58a and 58b is called the free spectral range of the etalon assembly 28. In this example, the free spectral range (FSR) is 0.020 nm. Further shifts in the signals 58a and 58b to the position in FIG. 12b may represent wavelengths at 248.030, 248.050, etc. nm and further shifts in the signals 58a and 58b to the position shown in FIG. 12c represent wavelengths at 248.040, 248.060, etc. nm.

The signals 94a and 94b may be also processed by the microprocessor 96 to determine the width of the beam of light from the laser 10. To determine this, the microprocessor 96 processes the wavelengths at the outer ends of the selected pair of signals 94a and 94b (represented by the distance 100 in FIG. 10) to obtain a first result and also processes the wavelengths at the inner ends of the signals 94a and 94b (represented by the distance 102 in FIG. 10) to obtain a second result. The microprocessor 96 then processes the first and second results on a subtractive basis to determine the thickness of the beam of light from the laser 10.

The microprocessor 96 also processes the signal 94c (FIG. 11) to determine the particular one of the free spectral ranges in which the wavelength of the light from the laser 10 is being produced. The microprocessor 96 determines this by determining the position of the signal 94c in the array of detectors 56. By providing this coarse indication, the microprocessor 96 resolves any ambiguities in the signals 94a and 94b. The resultant signal from the microprocessor 96 indicates the wavelength of the light from the microprocessor on a precise and unambiguous basis.

The microprocessor then processes the desired wavelength (e.g. 248.000 nm) of the light from the laser 10 and the resultant signal representing the actual wavelength of the light from the laser 10 to determine the change which should be made in the operating characteristics of the laser to correct the wavelength to the desired value such as 248.000 nm. This determination is represented by signals on a line 104 (FIG. 5) from the microprocessor 96.

The signals from the microprocessor 96 are introduced through the line 104 to the laser 10 to change to the wavelength of light from the laser to the particular value such as 248.000 nm. When the laser 10 is being pulsed at a repetition rate such 200 pulses per second, the adjustment in the wavelength of the light from the laser is made after each pulse from the laser and before the production of the next pulse from the laser. In this way, the wavelength of the pulses of light from the laser 10 is regulated on a real time basis at the particular value such as 248.000 nm, and high speed real time diagnostic information of wavelength and linewidth is made available.

The system and method described above have certain important advantages. They provide a precise regulation of the wavelength of the light from the laser 10 in real time without any ambiguities. The system and method are able to provide this regulation over a wide range of wavelengths without any adjustment. The system and method provide this regulation by operating upon the entire cross-section of the light beam from the laser 10. The system is disposed in a compact area relative to the laser 10 so as not to interfere with the operation of the laser. The system and method are not affected by changes in external parameters such as changes in atmospheric temperature and pressure.

Instead of using the grating 72 in the optical path 20 to provide the coarse wavelength information, an etalon assembly may be used. The etalon assembly may correspond to the assembly 28 shown in FIGS. 1 and 3 and described in detail above. One way of implementing such an etalon assembly may be to use a firmly mounted etalon in a cell of constant temperature and pressure (corresponding to the housing 30 in FIG. 3) instead of mounting the etalon on resilient supports such as the supports 34 in FIG. 3. In such an arrangement, a single ring arc is provided in the center of the linear array formed by the detectors 56 to provide a coarse indication of the wavelength of the light from the laser 10.

Figure 3:
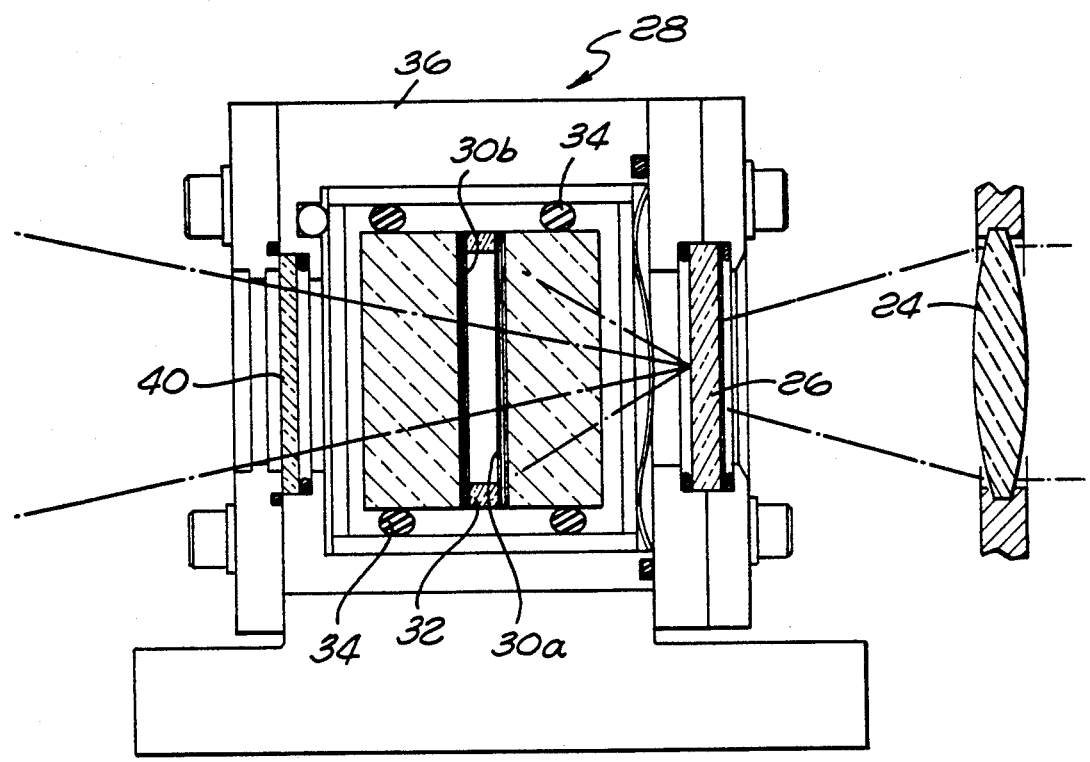
FIG. 3 is a view schematically illustrating the construction of an etalon assembly included in the optical system shown in FIG. 1.

In another embodiment, an etalon assembly may be resiliently mounted as in the embodiment shown in FIG. 3 to provide spaced rings 42 as shown in FIG. 6. However, these rings will not fit solely in the central portion of the detector array. To do this, it is desired to retain segments 110a and 110b (FIG. 13) at the opposite ends of the ring pattern and to consolidate these segments into a single pattern represented by portions 112*a* and 112*b* (FIG. 14) of rings corresponding respectively to the segments 110*a* and 110*b*. A prism 114 such as shown in FIG. 15 may be provided to retain only the ring portions 110 and 110*b* and to consolidate them into the portions 112*a* and 112*b*. The prism 114 acts to refract diverging light from the segments 110*a* and 110*b* and to collimate such light into the adjacent and interlocking patterns 112*a* and 112*b*.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for regulating the output of light from a laser at a particular wavelength,
   first means for providing a first optical path
   second means responsive to the light in the first optical path for producing first signals representing the wavelength of the light from the laser in a plurality of free spectral ranges,
   third means for providing a second optical path from the laser,
   fourth means responsive to the light in the second optical path for producing second signals representing the particular one of the free spectral ranges in which the wavelength of the light from the laser occurs, and
   fifth means responsive to the first and second signals for producing third signals to identify the wavelength of the light from the laser.

2. In a combination as set forth in claim 1,
   sixth means responsive to the third signals and to signals representing the particular wavelength for regulating the light from the laser to the particular wavelength.

3. In a combination as set forth in claim 1 wherein the first and third means are simultaneously operative and wherein the first and second optical paths have at least one common component.

4. In a combination as set forth in claim 2 wherein the laser is pulsed at a particular rate to produce pulses of light and wherein the first, second, third, fourth and fifth means are operative after each successive pulse to obtain the regulation by the sixth means of the wavelength of the light before the production of the next pulse.

5. In a combination as set forth in claim 4 wherein the first and third means are simultaneously operative and the first and third means have at least one common component and wherein
   the the light from the laser is in a beam and wherein the first optical path includes a first portion of the energy from the laser beam and the second optical path includes a second portion of the energy from the laser beam.

6. In combination for regulating the output of light from a laser at a particular wavelength in a particular spectral range,
   first optical means responsive to the light from the laser for obtaining the production of a first signal indicating that the light from the laser occurs in an individual one of a plurality of free spectral ranges,
   second optical means for obtaining the production of second signals indicating that the light from the laser has a particular value in each of the plurality of free spectral ranges, and
   third means responsive to the first and second signals from the first and second optical means for adjusting the light from the laser to the particular wavelength in the particular spectral range.

7. In a combination as set forth in claim 6,
   an array of detectors,
   the first optical means being disposed relative to the detectors and being operative to produce at a first one of the detectors the first signal representing the individual one of the free spectral ranges,
   the second optical means including means disposed relative to the detectors and operative to produce the second signals at second particular ones of the detectors, the second particular detectors being dependent upon the wavelength of the light from the detectors in the plurality of free spectral ranges,
   the third means including data processing means for processing the first and second signals to 8. In a combination as set forth in claim 6,
   the first optical means being operative to indicate the wavelength of the light from the laser within the individual one of the free spectral ranges without indicating the precise wavelength of the light within such free spectral range,
   the second optical means providing a precise indication of the wavelength of the light within the plurality of free spectral ranges from the laser without indicating the particular one of the free spectral ranges in which the wavelength of the light from the laser occurs, and
   the third means including data processing means for processing the first and second signals to adjust the light from the laser to the particular wavelength in the particular one of the free spectral ranges.

9. In a combination as set forth in claim 6,
   the first optical means being operative to energize one of the optical detectors to generate first signals representing the individual one of the free spectral ranges,
   the second optical means being operative, simultaneously with the operation of the first optical means, to energize other individual ones of the detectors to obtain the production of the second signals indicating that the light from the laser has the particular value in each of the plurality of free spectral ranges,
   fourth means for sweeping the detectors to reproduce the first and second signals, and
   the third means including data processing means responsive to the first and second signals, reproduced by sweeping the array of optical detectors, for adjusting the wavelength of the light from the laser to the particular value.

10. In combination for regulating the output of light from a laser at a particular wavelength,
    an array of optical detectors, the array being defined by central detectors and peripheral detectors on opposite sides of the central detectors,
    first means for providing optical indications of the specific wavelength of the light from the laser in each of a plurality of free spectral ranges,
    second means for providing optical indications of the wavelength of the light from the laser in a particular one of the free spectral ranges in which the wavelength of the light from the laser occurs, third means for energizing a particular one of the central detectors in the array in accordance with the optical indication of the free spectral range in which the wavelength of the light from the laser is being produced, and fourth means for energizing particular ones of the peripheral detectors in the array in accordance with the optical indications of the specific wavelength of the light from the laser in each of the free spectral ranges, and fifth means responsive to the signals from the particular one of the central detector and the particular ones of the peripheral detectors for regulating the light from the laser to the particular value.

11. In a combination as set forth in claim 10,
the second and first means providing separate optical paths to respectively provide the optical indications of the specific wavelength of the light from the laser in the plurality of free spectral ranges and the wavelength of the light from the laser in the free spectral range in which the wavelength of the light from the laser occurs, with the separate optical paths having common components at the beginnings and ends of the optical paths.

12. In a combination as set forth in claim 10,
the third and fourth means being simultaneously operative to energize the particular one of the central detectors int eh array and the particular ones of the peripheral detectors in the array, the second means including sixth means providing a first optical path from the laser to the particular one of the central detectors, the first means including seventh means providing a second optical path from the laser to the particular ones of the peripheral detectors.

13. In a combination as set forth in claim 11,
the third and fourth means being simultaneously operative to energize the particular one of the central detectors int eh array and the particular ones of the peripheral detectors in the array, and an optical mask including a pair of slits, the optical mask being constructed and disposed to pass light from the second means through a particular one of the slits to the particular one of the central detectors in the array and from the third optical means through the pair of slits to the particular ones of the peripheral detectors in the array.

14. In combination,
a laser operative to produce a beam of light at a particular wavelength, first means for providing a first indication f the wavelength of the light from the laser but with ambiguities recurring in a particular pattern, second means for providing a coarse indication of the wavelength of the light from the laser within a particular one of the recurring patterns, data processing means responsive to the fine and coarse indications for determining any deviations of the light form the laser from the particular wavelength, and third means responsive to the deviations of the light from the particular wavelength for adjusting the laser to obtain the production of light from the laser at the particular wavelength.

15. In a combination as set forth in claim 14,
a linear array of detectors,
the first and second means being simultaneously operative to produce, in the linear array of detectors, first signals representing the fine indication and second signals representing the coarse indication, and means for periodically sweeping the linear array to detect the first and second signals and to introduce the first and second signals to the data processing means for the determination of any deviation of the light from the laser from the particular wavelength.

16. In a combination as set forth in claim 14,
each of the first and second means being operative to sample the beam of light from the laser over the entire cross sectional area of the beam, and
the first and second means including common optical components.

17. In a combination as set forth in claim 14,
the light from the laser being pulsed, and
the first and second means, the data processing means and the third means being operative after each pulse of light from the laser to adjust the wavelength of the light from the laser to the particular value before the production of the next pulse of light from the laser.

18. In combination for regulating the output of light from a laser at a particular wavelength, the laser being operative to produce pulses of light at a particular rate, means responsive to the pulses of light from the laser for producing first signals indicating a particular one of a plurality of free spectral range in which the wavelength of the light from the laser is located, means responsive to the pulses of light from the laser for producing second signals representing the plurality of free spectral ranges and further representing the specific wavelength of the light from the laser in each of such free spectral ranges, data processing means responsive to the first and second signals for determining the changes which should be made in the wavelength of the light from the laser to provide the particular wavelength in the light from the laser, and means for changing the wavelength of the light from the laser to the particular wavelength after each pulse of light from the laser.

19. In a combination as set forth in claim 18,
the first signal means providing a first optical path from the laser and including first detectors responsive to the light in the first optical path to provide the first signals, and the second signal means providing a second optical path from the laser and including second detectors responsive to the light in the second optical path to provide the second signals.

20. In a combination as set forth in claim 19,
the first and second detectors being disposed in a linear array, and
means for sweeping the linear array of detectors to generate the first and second signals for introduction to the data processing means.

21. In a combination as set forth in claim 20,
each of the first and second signal means including a mask having a pair of slits,
the light in the first optical path passing through a particular one of the slits in the mask to the detectors in the central region in the linear array to activate a particular one of such detectors in accordance with the particular one of the free spectral ranges in which the wavelength of the light from the laser is located, the light in the second optical path passing through the pair of slits in the mask to the detectors in the peripheral region in the linear array to activate particular ones of such detectors in accordance with the specific wavelength of the light from the laser in each of the free spectral ranges.

22. In combination, a laser constructed to provide pulses of light at a particular rate, each pulse of light having a particular wavelength, an array of detectors each constructed to produce a signal when energized with optical light, means responsive to the pulses of light from the laser for introducing the pulses of light from the laser in a first optical path to first detectors in the array to obtain the production by the first detectors of signals representing a specific wavelength in each of a plurality of free spectral ranges, means responsive to the pulses of light from the laser for introducing the pulses of light from the laser in a second optical path to a second detector in the array to obtain the production by the second detector of signals representing an individual one of the free spectral ranges, and means responsive to the first and second signals for producing signals representing deviations from the particular value in the wavelength of the pulses of light from the laser.

23. In a combination as set forth in claim 22, means responsive to the signals representing the deviations from the particular value in the wavelength of the light from the laser for adjusting the laser to obtain the production of the pulses from the laser tat the particular wavelength.

24. In a combination as set forth in claim 22, means responsive to the signals representing the deviations from the particular value in the wavelength of the light from the laser after each pulse of light for adjusting the laser to obtain the production of the next pulse from the laser at the particular value, the array of detectors including the first and second detectors being disposed in a linear array.

25. In a combination as set forth in claim 24, the first detectors being disposed at the opposite peripheries of the linear array and the second detector being disposed at a central position in the linear array.

* * * * *